Feb. 8, 1938. S. P. MOYER ET AL 2,107,577
SHEARS
Filed Sept. 6, 1935 2 Sheets-Sheet 1
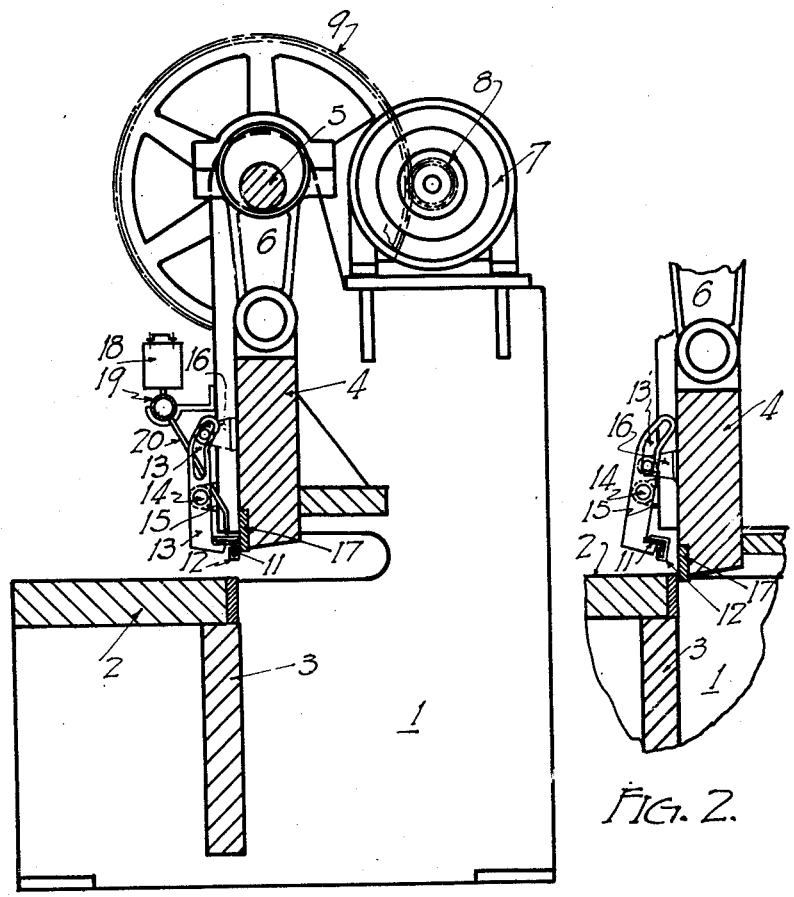
FIG. 1.
FIG. 2.
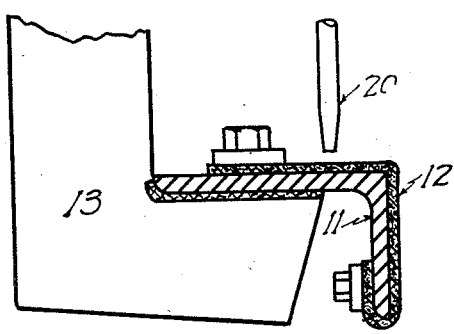
FIG. 3.
INVENTORS.
SAMUEL P. MOYER
AND PAUL H. LONG.
BY Allen & Allen
ATTORNEYS.

Patented Feb. 8, 1938

2,107,577

UNITED STATES PATENT OFFICE 2,107,577

SHEARS

Samuel P. Moyer and Paul H. Long, Middletown, Ohio, assignors to The American Rolling Mill Company, Middletown, Ohio, a corporation of Ohio Application September 6, 1935, Serial No. 39,462

5 Claims. (Cl. 164—47)

Our invention relates to shears having a fixed blade and a straight reciprocating blade, such as are used in trimming of iron and steel sheets in rolling mills.

The shear blades in shears used in shearing and trimming sheets are a source of much loss of time and expense in sheet mills, because they become dull rapidly and develop rough and jagged cutting edges, which is known as "galling". The machines themselves are very large, and delays in production, due to replacing blades, are common experience.

The short life of the shear blades in such machines is ascribed by us to the effect of hard scale which is present on the surfaces of the sheets being sheared or trimmed.

We have found that an effective lubrication, which includes a wiping action on the face of the movable shear blade, is surprisingly effective in preserving the blades of such shears. Apparently both blades are thus kept free of scale and retain their edges for as much as four to five times as long as without such lubrication.

Various mechanical arrangements may be provided in order to bring about a wiping of the movable shear blade with an oily material at some portion of each stroke.

Our preferred arrangement is illustrated in the accompanying drawings, and will be described in detail. The patentable features inherent in the structure will be described in the appended claims.

In the drawings:

Figure 1 shows a section through the shear with the head in the open position and the oiling device in contact with the blade.

Figure 2 is a similar view with the oiling device clear of the blade during the cutting operation.

Figure 3 shows an enlarged section of the oiling pad.

Figure 4:
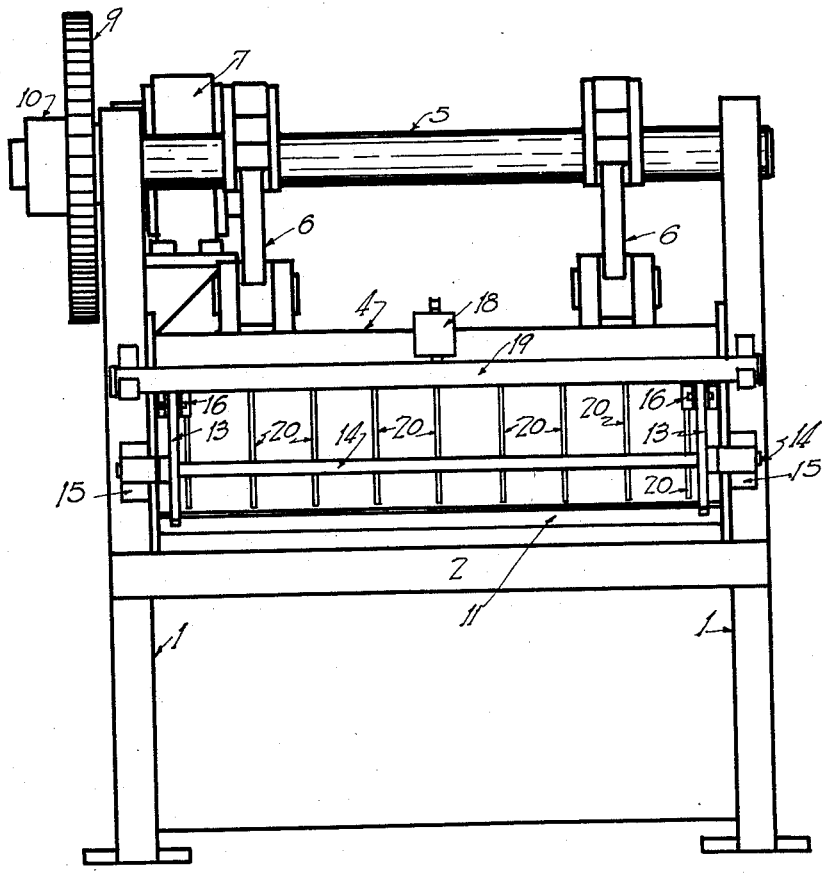
Figure 4 shows a front view of the shear equipped with the oiling device.

The shear housings are shown at 1, the bed plate at 2, and the blade supporting plate at 3. The shear blade head 4 is driven by the eccentric shaft 5 having pitmans 6 as shown. The shaft 5 is driven by the motor 7 through the pinion 8 and gear 9 under control of the clutch 10.

The oiling device consists of a longitudinal member 11 angular in shape, covered by a felt pad 12. The member 11 is carried by a pair of cam levers 13 which are mounted on a shaft 14 carried by bearing brackets 15 mounted on the shear housings. Mounted on the shear head 4 are studs 16 which engage the cam slots 13' in the levers 13. With this arrangement the downward movement of shear head 4 moves oiling member away from the shear blade 17 as indicated in Figure 2, whereas with the upper movement of the shear head 4 the oiling member 11 engages blade 17 as indicated in Figure 1.

Oil is supplied from a reservoir 18 through the header 19 mounted on the brackets 20 secured to the housing faces. Pipes 21 extending from the header drip oil on the pad, so that it is kept wet with the oil.

It will be noted that as the movable shear blade moves upwardly, and while it is still in motion, the oily pad is swung against it, thus wiping it down as well as keeping it oiled. Also, the pad lies against the cutting edge of the shear blade while it is in its upper position.

The result is that both blades of the shear are kept clean, and their useful condition very decidedly prolonged.

Having thus described an example of our invention, what we claim as novel and desire to secure by Letters Patent, is:

1. In a shear having a fixed blade and a reciprocating blade of the type described, positive means for wiping the reciprocating blade with oily material while said blade is moving, and mechanism for withdrawing said means from said blade before it begins its shearing function.

2. In a shear having a fixed blade and a reciprocating blade of the type described, means for wiping the reciprocating blade with oily material while said blade is moving, and mechanism for withdrawing said means from said blade before it begins its shearing function, arranged to apply the same to the said reciprocating blade at least once during each cycle of its operation.

3. In a shear having a fixed blade and a reciprocating blade of the type described, a wiper for the reciprocating blade, means for supplying lubricant thereto, and means for causing said wiper to move relatively to said blade in contact therewith.

4. In a shear having a fixed blade and a reciprocating blade of the type described, a wiper for the reciprocating blade, means for supplying lubricant thereto, and means for causing said wiper to move relatively to said blade in contact therewith at least once during each operation of the shear.

5. In a shear having a fixed blade and a reciprocating blade of the type described, a wiper for the reciprocating blade, and means for supplying lubricant thereto, tilting arms on which the wiper is supported, and means driven by the reciprocating blade for causing the wiper arms to tilt against the blade as it rises, and away from the blade as it falls.

SAMUEL P. MOYER.
PAUL H. LONG.